(12) United States Patent
Harville

(10) Patent No.: US 7,003,136 B1
(45) Date of Patent: Feb. 21, 2006

(54) PLAN-VIEW PROJECTIONS OF DEPTH IMAGE DATA FOR OBJECT TRACKING

(75) Inventor: Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 10/133,151

(22) Filed: Apr. 26, 2002

(51) Int. Cl.
*G06K 9/00* (2006.01)

(52) U.S. Cl. ............... 382/103; 382/154; 382/209; 348/169

(58) Field of Classification Search ............ 382/103, 382/118, 173, 154, 199, 209, 217, 276, 285, 382/294, 312, 243; 348/169
See application file for complete search history.

(56) References Cited

U.S. PATENT DOCUMENTS

| | | | | |
|---|---|---|---|---|
| 5,293,580 | A * | 3/1994 | Shimizu | 382/243 |
| 5,960,097 | A * | 9/1999 | Pfeiffer et al. | 382/103 |
| 6,188,777 | B1 * | 2/2001 | Darrell et al. | 382/103 |
| 6,421,451 | B1 * | 7/2002 | Shiratsuchi et al. | 382/101 |
| 6,697,502 | B1 * | 2/2004 | Luo | 382/115 |
| 6,829,384 | B1 * | 12/2004 | Schneiderman et al. | 382/154 |
| 6,837,432 | B1 * | 1/2005 | Tsikos et al. | 235/462.01 |

FOREIGN PATENT DOCUMENTS

WO  WO99/06940  2/1999

OTHER PUBLICATIONS

David Beymer, "Person Counting Using Stereo," Workshop on Human Motion 2000, pp. 127-133 (Dec. 2000).
T. Darrell et al., "Plan-View Trajectory Estimation With Dense Stereo Background Models," ICCV'01, pp. 628-635 (Jul. 2001).

* cited by examiner

*Primary Examiner*—Sheela Chawan

(57) ABSTRACT

Object tracking systems and methods are described. In one aspect, a three-dimensional point cloud is generated from a time series of video frames and partitioned into a set of vertically-oriented bins. The point cloud is mapped into one or more plan-view images each containing for each vertically-oriented bin a corresponding pixel having one or more values computed based upon one or more attributes of the point cloud members occupying the corresponding vertically-oriented bin. The object is tracked based at least in part upon one or more of the plan-view images. In another aspect, one or more original object templates are extracted from at least one of the one or more plan-view images, and the object is tracked based at least in part upon a comparison of at least one of the object templates with regions of the corresponding plan-view images. In another aspect, the point cloud may be discretized along the vertical axis into two or more horizontal partitions.

68 Claims, 6 Drawing Sheets

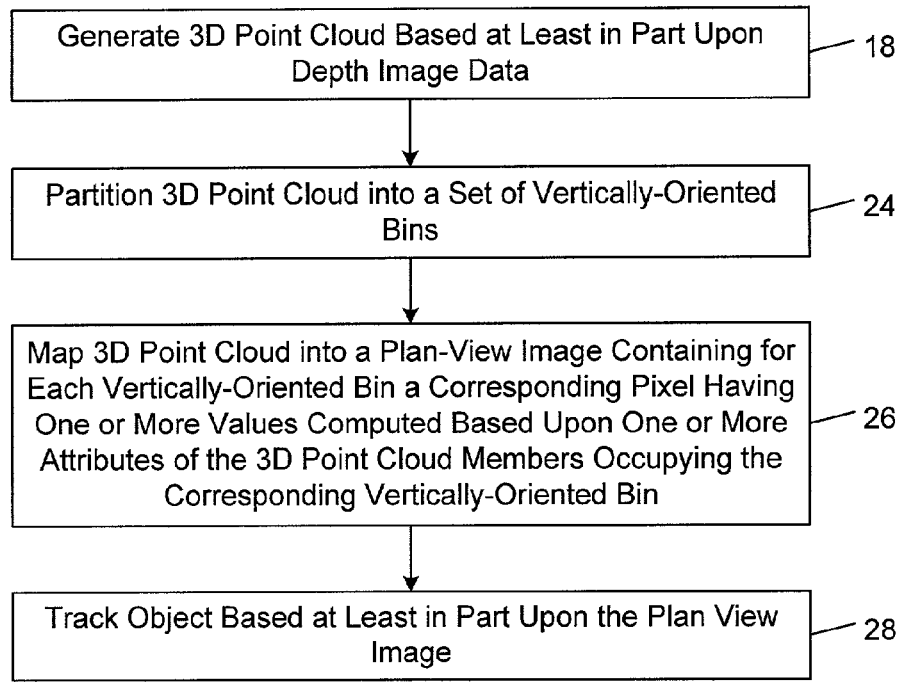
FIG. 1
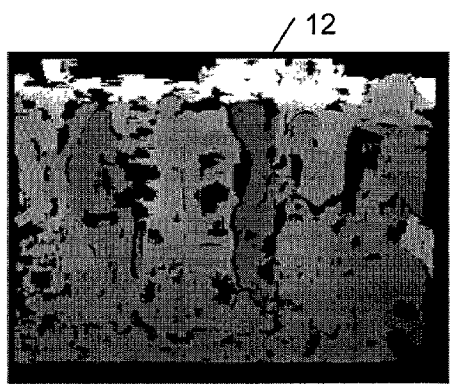
FIG. 2A  FIG. 2B

PLAN-VIEW PROJECTIONS OF DEPTH IMAGE DATA FOR OBJECT TRACKING

TECHNICAL FIELD

This invention relates to object tracking systems and methods.

BACKGROUND

Research has produced a large body of work concerning the use of video cameras for detecting and tracking people. Vision-based person tracking remains such an active field of research because it is still poorly solved and is beset by many difficult challenges, among the most significant of which are:

Foreground segmentation: Many person tracking methods rely on a preliminary step that separates novel or dynamic objects in the video ("foreground") from the rest of the scene ("background"), so that further, more expensive analysis may be focused on them. It is very difficult to perform this segmentation robustly in the presence of changing lighting conditions, dynamic background objects (such as moving foliage), shadows and inter-reflections, similar coloring between the foreground objects and the background, and occasional changes to "static" background objects (such as the moving of a chair).

Person discrimination: Typically, not all novel or dynamic objects segmented as foreground are people. They might also be cars, animals, shopping carts, or curtains blowing in the wind, among other things. Person tracking systems must distinguish people from other types of objects, and cannot simply rely on motion cues.

Occlusions: When people are temporarily blocked from the camera's view by static objects in the scene or by other people, tracking systems frequently err. For example, they often swap the identities of tracked people who occlude each other while crossing paths. In addition, when a person passes behind a large object and then re-emerges, tracking systems often fail to associate the emerging person with the one who disappeared.

Track confusion: When tracking several people simultaneously, systems often struggle to associate a constant identity with each tracked individual, even when occlusions are somewhat minimal. For instance, people can approach each other closely, perhaps holding a book together or embracing. They can quickly change appearance, perhaps by removing a hat or a bag, or by simply turning around. They can also change their velocity rapidly. All of these factors create great difficulties for algorithms that rely heavily on appearance feature matching or trajectory prediction.

While most vision-based person tracking methods operate primarily on color or grayscale video, interest in augmenting this input space with depth (or disparity) imagery has grown as hardware and software for computing this data from stereo cameras has recently become much faster and cheaper. Depth data has great potential for improving the performance of person tracking systems because it:

Provides shape and metric size information that can be used to distinguish people from other foreground objects;

Allows occlusions of people by each other or by background objects to be detected and handled more explicitly;

Permits the quick computation of new types of features for matching person descriptions across time; and Provides a third, disambiguating dimension of prediction in tracking.

Several person detection and tracking methods that make use of real-time, per-pixel depth data have been described in recent years. Most of these methods analyze and track features, statistics, and patterns directly in the depth images themselves. This methodology is not as fruitful as one might hope, however, because today's stereo cameras produce depth images whose statistics are far less clean than those of standard color or monochrome video. For multi-camera stereo implementations, which compute depth by finding small area correspondences between image pairs, unreliable measurements often occur in image regions of little visual texture, as is often the case for walls, floors, or people wearing uniformly-colored clothing, so that much of the depth image is unusable. Also, it is not possible to find the correct correspondences in regions, usually near depth discontinuities in the scene, which are visible in one stereo input image but not the other. This results in additional regions of unreliable data, and causes the edges of an object in a depth image to be noisy and poorly aligned with the object's color image edges.

Even at pixels where depth measurements typically are informative, the sensitivity of the stereo correspondence computation to very low levels of imager noise, lighting fluctuation, and scene motion leads to substantial depth noise. For apparently static scenes, the standard deviation of the depth value at a pixel over time is commonly on the order of 10% of the mean—much greater than for color values produced by standard imaging hardware.

To combat these problems, some very recent person tracking methods have been based not on analysis of the raw depth images, but instead on the metric shape and location information inherent in the original "camera-view" depth images to compute occupancy maps of the scene as if it were observed by an overhead, orthographic camera.

SUMMARY

In one aspect of the invention, a three-dimensional point cloud is generated from a time series of video frames. The three-dimensional point cloud has members with one or more associated attributes obtained from the time series of video frames and representing selected image pixels in a three-dimensional coordinate system spanned by a ground plane and a vertical axis orthogonal to the ground plane. The three-dimensional point cloud is partitioned into a set of vertically-oriented bins. The partitioned three-dimensional point cloud is mapped into one or more plan-view images each containing for each vertically-oriented bin a corresponding pixel having one or more values computed based upon one or more attributes of the three-dimensional point cloud members occupying the corresponding vertically-oriented bin. The object is tracked based at least in part upon one or more of the plan-view images.

In another aspect of the invention, the partitioned three-dimensional point cloud is mapped into one or more plan-view images each containing for each vertically-oriented bin a corresponding pixel having one or more values computed based upon the three-dimensional point cloud members occupying the corresponding vertically-oriented bin. One or more object templates are extracted from at least one of the one or more plan-view images. The object is tracked based at least in part upon a comparison of at least one of the object templates with regions of the corresponding plan-view images.

In another aspect of the invention, the three-dimensional point cloud is partitioned into a set of vertically-oriented bins. The three-dimensional point cloud also is discretized along the vertical axis into two or more horizontal partitions. The partitioned three-dimensional point cloud is mapped into two or more plan-view images each containing for each vertically-oriented bin a corresponding pixel having one or more values computed based upon the three-dimensional point cloud members occupying a respective horizontal partition of the corresponding vertically-oriented bin. The object is tracked based at least in part upon one or more of the plan-view images.

In others aspects, the invention features systems for implementing the above-described object tracking methods.

Other features and advantages of the invention will become apparent from the following description, including the drawings and the claims.

DESCRIPTION OF DRAWINGS

FIG. 1 is a flow diagram of a method of tracking an object.

FIG. 2A is a frame from a dense depth video stream.

FIG. 2B is a frame from a color video stream that is spatially- and temporally aligned with the dense depth video stream frame of FIG. 2A.

DETAILED DESCRIPTION

Figure 3:
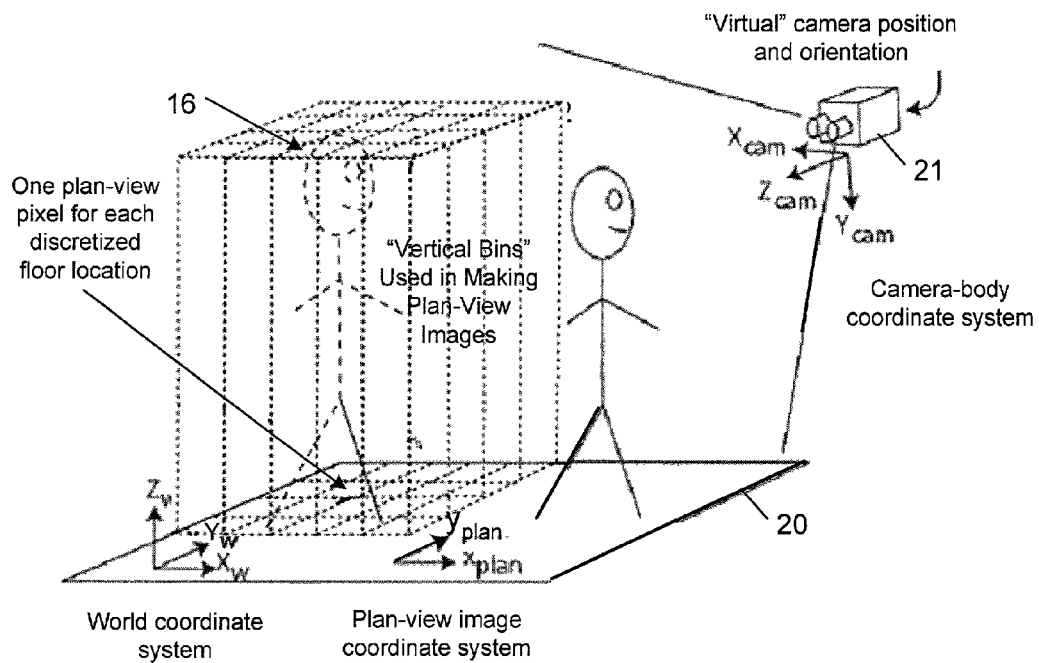
FIG. 3 is a diagrammatic perspective view of a three-dimensional coordinate system for a visual scene and a three-dimensional point cloud spanned by a ground plane and a vertical axis that is orthogonal to the ground plane.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

1 Introduction

The embodiments described in detail below provide an improved solution to the problem of object tracking, especially when only passive (observational) means are allowable. In accordance with this solution, objects may be tracked based upon plan-view imagery that enables much richer and more powerful representations of tracked objects to be developed and used, and therefore leads to significant tracking improvement.

The following description covers a variety of systems and methods of simultaneously detecting and tracking multiple objects in a visual scene using a time series of video frames representative of the visual scene. In some embodiments, a three-dimensional point cloud is generated from depth or disparity video imagery, optionally in conjunction with spatially and temporally aligned video imagery of other types of pixel attributes, such as color or luminance. A "dense depth image" contains at each pixel location an estimate of the distance from the camera to the portion of the scene visible at that pixel. Depth video streams may be obtained by many methods, including methods based on stereopsis (i.e., comparing images from two or more closely-spaced cameras), lidar, or structured light projection. All of these depth measurement methods are advantageous in many application contexts because they do not require the tracked objects to be labeled or tagged, to behave in some specific manner, or to otherwise actively aid in the tracking process in any way. In the embodiments described below, if one or more additional "non-depth" video streams (e.g., color or grayscale video) are also used, these streams preferably are aligned in both space and time with the depth video. Specifically, the depth and non-depth streams preferably are approximately synchronized on a frame-by-frame basis, and each set of frames captured at a given time are taken from the same viewpoint, in the same direction, and with the non-depth frames' field of view being at least as large as that for the depth frame.

Although the embodiments described below are implemented with "depth" video information as an input, these embodiments also may be readily implemented with disparity video information as an input.

In the illustrated embodiments, the detection and tracking steps are performed in three-dimensional (3D) space so that these embodiments supply the 3D spatial trajectories of all objects that they track. For example, in some embodiments, the objects to be tracked are people moving around on a roughly planar floor. In such cases, the illustrated embodiments will report the floor locations occupied by all tracked people at any point in time, and perhaps the elevation of the people above or below the "floor" where it deviates from planarity or where the people step onto surfaces above or below it. These embodiments attempt to maintain the correct linkages of each tracked person's identity from one frame to the next, instead of simply reporting a new set of unrelated person sightings in each frame.

As explained in detail below, the illustrated embodiments introduce a variety of transformations of depth image data (optionally in conjunction with non-depth image data) that are particularly well suited for use in object detection and tracking applications. We call these transformations "plan-view" projections, and describe the concept briefly here. A more complete description may be found in Section 2 below.

Referring to FIGS. 1, 2A, 2B and 3, in some embodiments, an object (e.g., a person) that is observable in a time series of video frames of depth image pixels representative of a visual scene may be tracked based at least in part upon plan-view images as follows. In the illustrated embodiment, both depth image frames 12 (FIG. 2A) and spatially- and temporally aligned color image frames 14 (FIG. 2B) are used in the construction of plan-view images.

Initially, a three-dimensional point cloud 16 having members with one or more associated attributes obtained from the time series of video frames is generated (step 18; FIG. 1). In this process, we first select some subset of pixels in the depth image to be used. In some embodiments, all pixels in the depth image may be used. In other embodiments, a subset of depth image pixels is chosen through a process of "foreground segmentation," in which the novel or dynamic objects in the scene are detected and selected. The precise choice of method of foreground segmentation is not critical. Next, we define a 3D "world" coordinate system, spanned by X-, Y-, and Z-axes. The plane 20 spanned by the X- and Y-axes is taken to represent "ground level." Such a plane 20 need not physically exist; its definition is more akin to that of "sea level" in map-building contexts. In the case of tracking applications in room environments, it is convenient to define "ground level" to be the plane that best approximates the physical floor of the room. We define the Z-axis (or vertical axis) to be oriented normally to this ground level plane. We also measure the position and orientation in this space of the "virtual camera" 21 that is producing the depth and optional non-depth video. By "virtual camera," we refer to the fact that the video streams used by the system may appear to have a camera center location and view orientation that does not equal that of any real, physical camera used in obtaining the data. The apparent viewpoint and orientation of the virtual camera may be produced by warping, interpolating, or otherwise transforming video obtained by one or more real cameras.

After the three-dimensional coordinated system has been defined, the 3D location of each of the subset of selected pixels is computed. This is done using the image coordinates of the pixel, the depth value of the pixel, the camera calibration information, and knowledge of the orientation and position of the virtual camera in the 3D coordinate system. This step produces a "3D point cloud" 16 representing the selected depth image pixels. If non-depth video streams also are being used, each point in the cloud is labeled with the non-depth image data from the pixel in each non-depth video stream that corresponds to the depth image pixel from which that point in the cloud was generated. For example, if color video is being used in conjunction with depth, we label each point in the cloud with the color at the color video pixel corresponding to the depth video pixel from which the point was generated.

We next partition the 3D point cloud into bins 22 that are oriented vertically (along the Z-axis), normal to the ground level plane (step 24; FIG. 1). These bins 22 typically intersect the ground level XY-plane 20 in a regular, rectangular pattern, but do not need to do so. The spatial extent of each bin 22 along the Z-dimension may be infinite, or it may be truncated to some range of interest for the objects being tracked. For instance, in person-tracking applications, we may wish to truncate the Z-extent of the bins to be from ground level to a reasonable maximum height for human beings.

We can now construct one or more types of plan-view images from this partitioned 3D point cloud (step 26; FIG. 1). Each plan-view image contains one pixel for each bin, and the value at that pixel is based on some property of the members of the 3D point cloud that fall in that bin. Many specific embodiments relying on one or more of these types of plan-view images may be built, and we do not attempt to fully detail all of them. Instead, we describe several types of plan-view images below, and explain how they may be used in object detection and tracking systems. Other types of plan-view images may be inferred readily from the description contained herein by one having ordinary skill in the art of object tracking.

As explained in detail below, an object may be tracked based at least in part upon the plan-view image (step 28; FIG. 1). A pattern of image values, referred to herein as a "template", is extracted from the plan-view image to represent an object at least in part. The object is tracked based at least in part upon comparison of the object template with regions of successive plan-view images. The template may be updated over time with values from successive/new plan-view images. Updated templates may be examined to determine the quality of their information content. In some embodiments, if this quality is found to be too low, by some metric, a template may be updated with values from an alternative, nearby location within the plan-view image. An updated template may be examined to determine whether or not the plan-view image region used to update the template is likely to be centered over the tracked target object. If this determination suggests that the centering is poor, a new region that is likely to more fully contain the target is selected, and the template is updated with values from this re-centered target region. Although the embodiments described below apply generally to detection and tracking of any type of dynamic object, the illustrated embodiments are described in the exemplary application context of person detection and tracking.

2 Building Maps of Plan-View Statistics 2.1 Overview

The motivation behind using plan-view statistics for person tracking begins with the observation that, in most situations, people usually do not have significant portions of their bodies above or below those of other people.

With a stereo camera, we can produce orthographically projected, overhead views of the scene that separate people well. In addition, we can produce these images even when the stereo camera is not mounted overhead, but instead at an oblique angle that maximizes viewing volume and preserves our ability to see faces. All of this is possible because the depth data produced by a stereo camera allows for the partial 3D reconstruction of the scene, from which new images of scene statistics, using arbitrary viewing angles and camera projection models, can be computed. Plan-view images are just one possible class of images that may be constructed, and are discussed in greater detail below.

Every reliable measurement in a depth image can be back-projected to the 3D scene point responsible for it using camera calibration information and a perspective projection model. By back-projecting all of the depth image pixels, we create a 3D point cloud representing the portion of the scene visible to the stereo camera. As explained above, if we know the direction of the "vertical" axis of the world (i.e., the axis normal to the ground level plane in which we expect people to be well-separated) we can discretize space into a regular grid of vertically oriented bins, and then compute statistics of the 3D point cloud within each bin. A plan-view image contains one pixel for each of these vertical bins, with the value at the pixel being some statistic of the 3D points within the corresponding bin. This procedure effectively builds an orthographically projected, overhead view of some property of the 3D scene, as shown in FIG. 3.

2.2 Video Input and Camera Calibration

Figure 4:
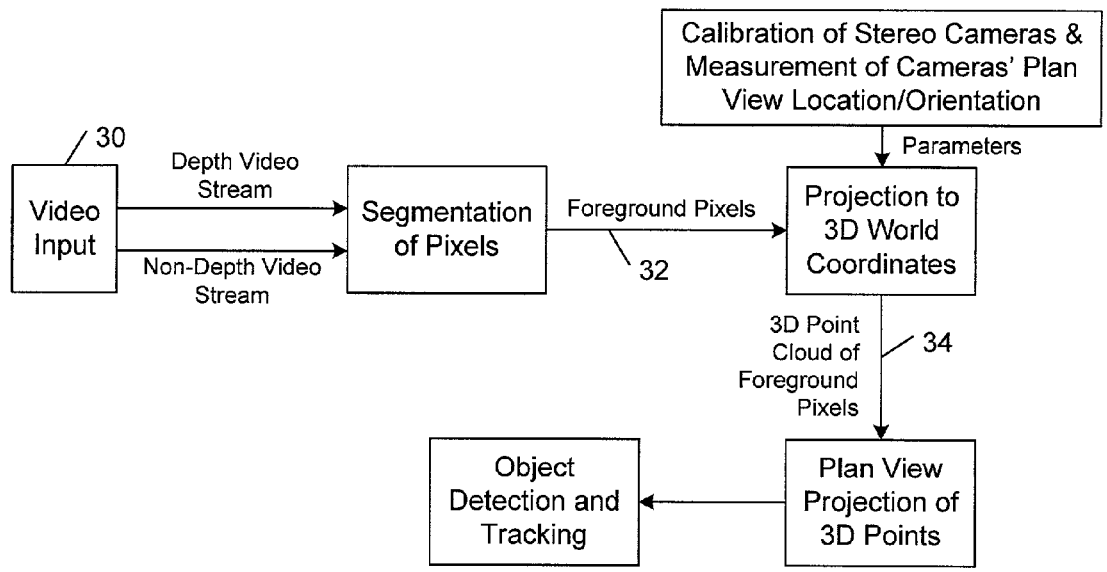
FIG. 4 is a block diagram of an implementation of the method of FIG. 1.
Figure 5A:
FIG. 5A is a color video frame of a visual scene.
Figure 5B:
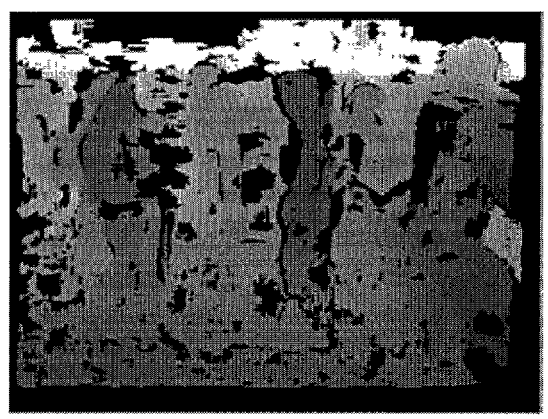
FIG. 5B is a depth video frame corresponding to the color video frame of FIG. 5A.

Referring to FIGS. 4, 5A, 5B and 5C, in one implementation of the method of FIG. 1, the input 30 is a video stream of "color-with-depth"; that is, the data for each pixel in the video stream contains three color components and one depth component. For example, depth and color from one frame of such a stream are shown in FIGS. 5A and 5B. In some embodiments, color-with-depth video is produced at 320×240 resolution by a combination of the Point Grey Digiclops camera and the Point Grey Triclops software library (available from Point Grey, Inc. of Vancouver, British Columbia, Canada).

For embodiments in which multi-camera stereo implementations are used to provide depth data, some calibration steps are needed. First, each individual camera's intrinsic parameters and lens distortion function should be calibrated to map each camera's raw, distorted input to images that are suitable for stereo matching. Second, stereo calibration and determination of the cameras' epipolar geometry is required to map disparity image values (x, y, disp) to depth image values (x, y, $Z_{cam}$). This same calibration also enables us to use perspective back projection to map disparity image values (x, y, disp) to 3D coordinates ($X_{cam}$, $Y_{cam}$, $Z_{cam}$) in the frame of the camera body. The parameters produced by this calibration step essentially enable us to treat the set of individual cameras as a single virtual camera head producing color-with-depth video. In the disparity image coordinate system, the x- and y-axes are oriented left-to-right along image rows and top-to-bottom along image columns, respectively. In the camera body coordinate frame, the origin is at the camera principal point, the $X_{cam}$- and $Y_{cam}$-axes are coincident with the disparity image x- and y-axes, and the $Z_{cam}$-axis points out from the virtual camera's principal point and is normal to the image plane. The parameters required from this calibration step are the camera baseline separation b, the virtual camera horizontal and vertical focal lengths $f_x$ and $f_y$ (for the general case of non-square pixels), and the image location ($x_0$, $y_0$) where the virtual camera's central axis of projection intersects the image plane.

In general, the rigid transformation relating the camera body ($X_{cam}$, $Y_{cam}$, $Z_{cam}$) coordinate system to the ($X_W$, $Y_W$, $Z_W$) world space must be determined so that we know just what direction "overhead" is, and so that we know how far the camera is above the ground. Both of these coordinate systems are shown in FIG. 3. We specifically seek the rotation matrix $R_{cam}$ and translation vector $\vec{t}_{cam}$ required to move the real stereo camera into alignment with an imaginary stereo camera located at the world origin and with $X_{cam}$-, $Y_{cam}$-, and $Z_{cam}$-axes aligned with the world coordinate axes.

Many standard methods exist for accomplishing these calibration steps. Since calibration methods are not our focus here, we do not describe particular techniques, but instead set forth the requirements that, whatever methods are used, they result in the production of distortion-corrected color-with-depth imagery, and they determine the parameters b, $f_x$, $f_y$, ($x_0$, $y_0$), $R_{cam}$, and $\vec{t}_{cam}$ described above.

In some embodiments, to maximize the volume of viewable space without making the system overly susceptible to occlusions, we prefer to mount the stereo camera at a relatively high location, with the central axis of projection roughly midway between parallel and normal to the XY-plane. In these embodiments, we also prefer to mount the cameras relatively close together, with a separation of 10–20 cm. However, the method is applicable for any positioning and orientation of the cameras, provided that the above calibration steps can be performed accurately. We use lenses with as wide a field of view as possible, provided that the lens distortion can be well-corrected.

2.3 Foreground Segmentation

In some embodiments, rather than use all of the image pixels in building plan-view maps, we restrict our attention to objects in the scene that are novel or that move in ways that are atypical for them. In the illustrated embodiments, we restrict our attention to the "foreground" in the scene, as in FIG. 5C. We extract foreground pixels 32 using a method that models both the color and depth statistics of the scene background with Time-Adaptive, Per-Pixel Mixtures Of Gaussians (TAPPMOGs), as detailed in U.S. patent application Ser. No. 10/006,687, filed Dec. 10, 2001, by Michael Harville, and entitled "Segmenting Video Input Using High-Level Feedback," which is incorporated herein by reference. In summary, this foreground segmentation method uses a time-adaptive Gaussian mixture model at each pixel to describe the recent history of observations at that pixel. Observations are modeled in a four-dimensional feature space consisting of depth, luminance, and two chroma components. A subset of the Gaussians in each pixel's mixture model is selected at each time step to represent the background. At each pixel where the current color and depth are well-described by that pixel's background model, the current video data is labeled as background. Otherwise, it is labeled as foreground. The foreground is refined using connected components analysis. This foreground segmentation method is significantly more robust than other, prior pixel level techniques to a wide variety of challenging, real world phenomena, such as shadows, inter-reflections, lighting changes, dynamic background objects (e.g. foliage in wind), and color appearance matching between a person and the background. In these embodiments, use of this method enables the person tracking system to function well for extended periods of time in arbitrary environments.

In some embodiments where such robustness is not required in some context, or where the runtime speed of this segmentation method is not sufficient on a given platform, one may choose to substitute simpler, less computationally expensive alternatives at the risk of some degradation in person tracking performance. Of particular appeal is the notion of using background subtraction based on depth alone. Such methods typically run faster than those that make use of color, but must deal with what to do at the many image locations where depth measurements have low confidence (e.g., in regions of little visual texture and in regions, often near depth discontinuities in the scene, that are visible in one image but not the other).

In some embodiments, color data may be used to provide an additional cue for making better decisions in the absence of quality depth data in either the foreground, background, or both, thereby leading to much cleaner foreground segmentation. Color data also usually is far less noisy than stereo-based depth measurements, and creates sharper contours around segmented foreground objects. Despite all of this, we have found that foreground segmentation based on depth alone is usually sufficient to enable good performance of our person tracking method. This is true in large part because subsequent steps in our method ignore portions of the foreground for which depth is unreliable. Hence, in situations where computational resources are limited, we believe that depth-only background subtraction is alternative that should be considered.

2.4 Plan-View Height and Occupancy Images

In some embodiments, each foreground pixel with reliable depth is used in building plan-view images. The first step in building plan-view images is to construct a 3D point cloud 34 (FIG. 4) from the camera-view image of the foreground. For implementations using a binocular stereo pair with horizontal separation b, horizontal and vertical focal lengths $f_u$ and $f_v$, and image center of projection (u, $v_c$), we can project the disparity (disp) at camera-view foreground pixel (u, v) to a 3D location ($X_{cam}$, $Y_{cam}$, $Z_{cam}$) in the camera body coordinate frame (see FIG. 1) as follows:

$$Z_{cam} = \frac{bf_u}{disp}, \quad (1)$$

$$X_{cam} = \frac{Z_{cam}(u - u_0)}{f_u},$$

$$Y_{cam} = \frac{Z_{cam}(v - v_0)}{f_v}$$

We then transform these camera frame coordinates into the ($X_W$, $Y_W$, $Z_W$) world space, where the $Z_W$ axis is aligned with the "vertical" axis of the world and the $X_W$ and $Y_W$ axes describe a ground level plane, by applying the rotation $R_{cam}$ and translation $\vec{t}_{cam}$ relating the coordinate systems:

$$[X_W Y_W Z_W]^T = -R_{cam}[X_{cam} Y_{cam} Z_{cam}]^T - \vec{t}_{cam} \quad (2)$$

The points in the 3D point cloud are associated with positional attributes, such as their 3D world location ($X_W$, $Y_W$, $Z_W$), where $Z_W$ is the height of a point above the ground level plane. The points may also be labeled with attributes from video imagery that is spatially and temporally aligned with the depth video input. For example, in embodiments constructing 3D point clouds from foreground data extracted from color-with-depth video, each 3D point may be labeled with the color of the corresponding foreground pixel.

Before building plan-view maps from the 3D point cloud, we must choose a resolution $\delta_{ground}$ with which to quantize 3D space into vertical bins. In some embodiments, this resolution is selected to be small enough to represent the shapes of people in detail, within the limitations imposed by the noise and resolution properties of the depth measurement system. In one implementation, we typically divide the $X_W Y_W$-plane into a square grid with resolution $\delta_{ground}$ of 2–4 cm.

After choosing the bounds ($X_{min}$, $X_{max}$, $Y_{min}$, $Y_{max}$) of the ground level area within which we will restrict our attention, we can map 3D point cloud coordinates to their corresponding plan-view image pixel locations as follows:

$$x_{plan} = \lfloor (X_W - X_{min})/\delta_{ground} + 0.5 \rfloor, y_{plan} = \lfloor (Y_W - Y_{min})/\delta_{ground} + 0.5 \rfloor \quad (3)$$

In some embodiments, we examine statistics of the point cloud that are related to the counts of the 3D points within the vertical bins. When such a statistic is used as the value of the plan-view image pixel that corresponds to a bin, we call the resulting plan-view image a "plan-view occupancy map", since the image effectively describes the quantity of point cloud material "occupying" the space above each floor location. Although powerful, this representation discards virtually all object shape information in the vertical ($Z_W$) dimension. In addition, the occupancy map representation of an object will show a sharp decrease in saliency when the object moves to a location where it is partially occluded by another object, because far fewer 3D points corresponding to the object will be visible to the camera.

We also propose to look at the statistics of the $Z_W$-coordinate attributes of the point cloud members. For simplicity, we refer to $Z_W$-values as "height" since it is often the case that the ground level plane, where $Z_W = 0$, is chosen to approximate the floor of the physical space in which tracking occurs. One height statistic of particular utility is the highest $Z_W$-value (the "maximum height") associated with any of the point cloud members that fall in a bin. When this is used as the value at the plan-view image pixel that corresponds to a bin, we call the resulting plan-view image a "plan-view height map," since it effectively renders an image of the shape of the scene as if viewed (with orthographic camera projection) from above. Height maps preserve about as much 3D shape information as is possible in a 2D image, and therefore seem better suited than occupancy maps for distinguishing people from each other and from other objects. This shape data also provides richer features than occupancy for accurately tracking people through close interactions and partial occlusions. Furthermore, when the stereo camera is mounted in a high position at an oblique angle, the heads and upper bodies of people often remain largely visible during inter-person occlusion events, so that a person's height map representation is usually more robust to partial occlusions than the corresponding occupancy map statistics. In other embodiments, the sensitivity of the "maximum height" height map may be reduced by sorting the points in each bin according to height, and use something like the $90^{th}$ percentile height value as the pixel value for the plan-view map. Use of the point with maximal, rather than, for example, $90^{th}$ percentile, height within each vertical bin allows for fast computation of the height map, but makes the height statistics very sensitive to depth noise. In addition, the movement of relatively small objects at heights similar to those of people's heads, such as when a book is placed on an eye-level shelf, can appear similar to person motion in a height map. Alternative types of plan-view maps based on height statistics could use the minimum height value of all points in a bin, the average height value of bin points, the median value, the standard deviation, or the height value that exceeds the heights of a particular percentage of other points in the bin.

Figure 5C:
FIG. 5C is a foreground image frame corresponding to the color video frame of FIG. 5A after background pixels have been removed in accordance with a pixel segmentation step in the method of FIG. 4.
Figure 6:
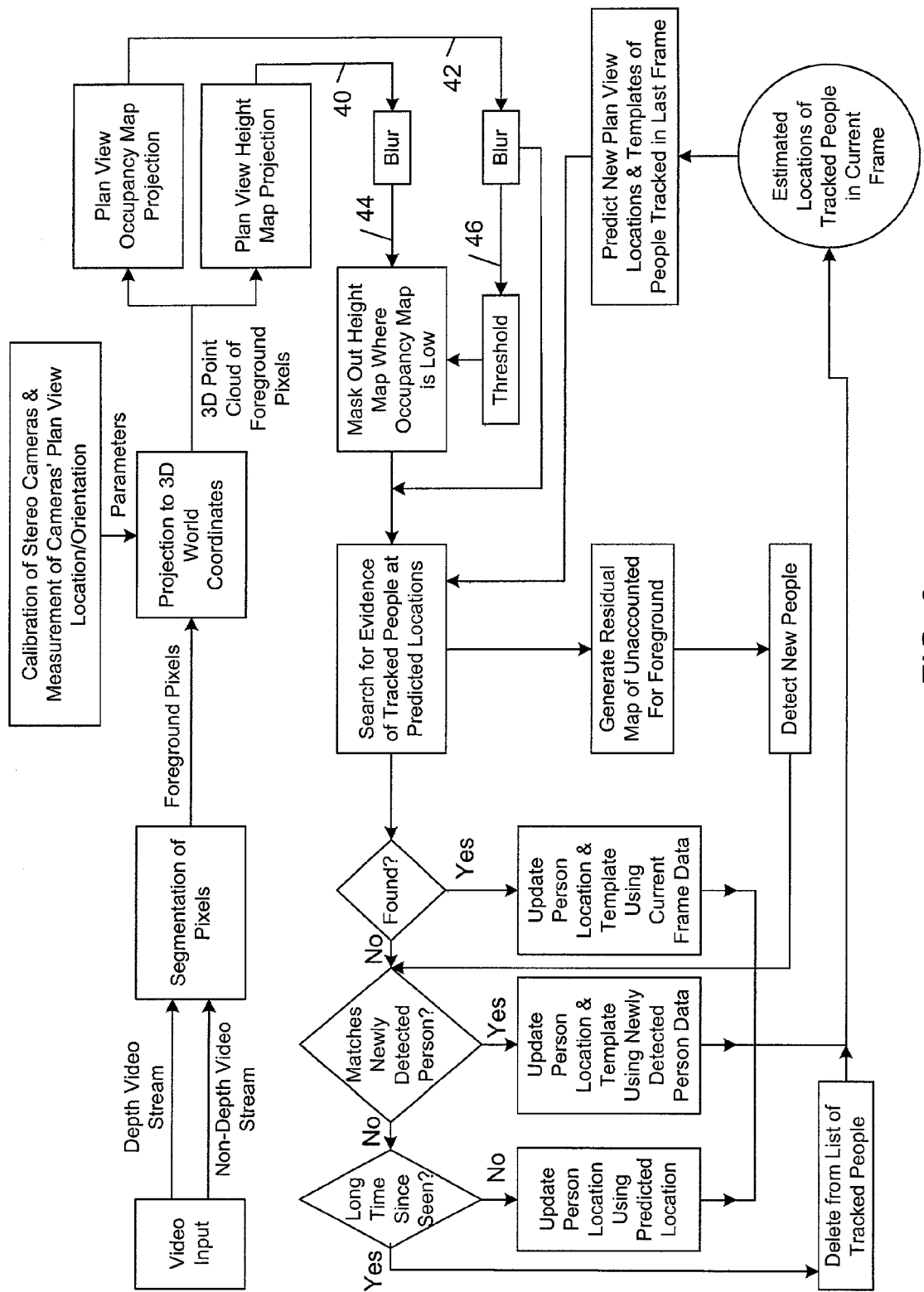
FIG. 6 is a flow diagram of an implementation of the method of FIG. 4.
Figure 7A:
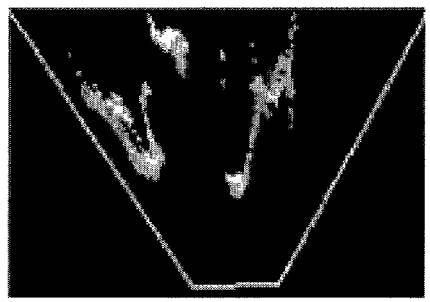
FIGS. 7A, 7B, 7C and 7D are plan-view maps corresponding to the extracted foreground image frame of FIG. 5C and generated in accordance with the method of FIG. 6.
Figure 7B:
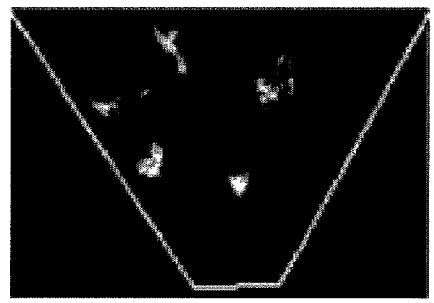

Referring to FIG. 6, in one implementation of the method of FIG. 4, plan-view height and occupancy maps 40, 42, denoted as $\mathcal{H}$ and $\mathcal{O}$ respectively, are computed in a single pass through the foreground image data. The methods described in this paragraph apply more generally to any selected pixels of interest for which depth or disparity information is available, but we illustrate the exemplary case of using foreground pixels here. To build the plan-view maps, we first set all pixels in both maps to zero. Then, for each pixel classified as foreground, we compute its plan-view image location ($x_{plan}$, $y_{plan}$), $Z_W$-coordinate, and $Z_{cam}$-coordinate using equations (1), (2), and (3). If the $Z_W$-coordinate is greater than the current height map value $\mathcal{H}(x_{plan}, y_{plan})$, and if it does not exceed $H_{max}$ where, in one implementation, $H_{max}$ is an estimate of how high a very tall person could reach with his hands if he stood on his toes, we set $\mathcal{H}(x_{plan}, y_{plan}) = Z_W$. We next increment the occupancy map value $\mathcal{O}(x_{plan}, y_{plan})$ by $Z^2_{cam}/f_u f_v$, which is an estimate of the real area subtended by the foreground image pixel at distance $Z_{cam}$ from the camera. The plan-view occupancy map will therefore represent the total physical surface area of foreground visible to the camera within each vertical bin of the world space. The plan-view height and occupancy maps corresponding to the foreground of FIG. 5C are shown in FIGS. 7A and 7B, respectively.

Because of the substantial noise in these plan-view maps, we denote them as $\mathcal{H}_{raw}$ and $\mathcal{O}_{raw}$. In some embodiments, we smooth these raw plan-view maps prior to further analysis. In one implementation, the smoothed maps 44, 46, denoted $\mathcal{H}_{sm}$ and $\mathcal{O}_{sm}$, are generated by convolution with a Gaussian kernel whose variance in plan-view pixels, when multiplied by the map resolution $\delta_{ground}$, corresponds to a physical size of 1–4 cm. This reduces depth noise in person shapes, while retaining gross features like arms, legs, and heads.

Although the shape data provided by $\mathcal{H}_{sm}$ is very powerful, it is preferred not to give all of it equal weight. In some embodiments, the smoothed height map statistics are used only in floor areas where we believe that something "significant" is present, as indicated, for example, by the amount of local occupancy map evidence. In these embodiments, we prune $\mathcal{H}_{sm}$ by setting it to zero wherever the corresponding pixel in $\mathcal{O}_{sm}$, is below a threshold $\theta_{occ}$. By refining the height map statistics with occupancy statistics, foreground noise that appears to be located at "interesting" heights may be discounted, helping us to ignore the movement of small, non-person foreground objects, such as a book or sweater that has been placed on an eye-level shelf by a person. This approach circumvents many of the problems of using either statistic in isolation.

Figure 7C:
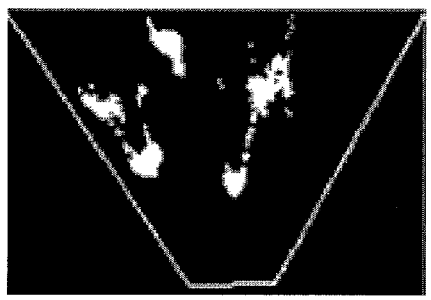
Figure 7D:
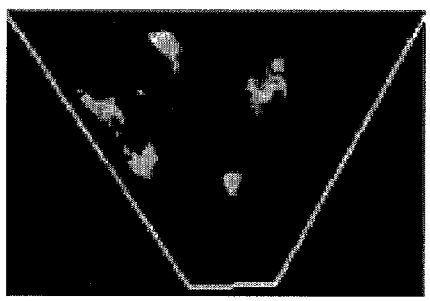

FIG. 7C shows the mask obtained by applying the threshold $\theta_{occ}$, to the smoothed occupancy map of the foreground of FIG. 5C. The result of applying this mask to $\mathcal{H}_{sm}$ is shown in FIG. 7D. This masked height map $\mathcal{H}_{masked}$, along with the smoothed occupancy map $\mathcal{O}_{sm}$, provide the basis for the exemplary tracking algorithm described in Section 4.

3 Tracking and Adapting Templates of Plan-View Statistics 3.1 Person Detection

We begin to detect a new person in the scene by looking for a significant "pile of pixels" in the occupancy map that has not been accounted for by tracking of people found in previous frames. More precisely, after tracking of known people has been completed, and after the occupancy and height evidence supporting these tracked people has been deleted from the plan-view maps, we convolve the occupancy map $\mathcal{O}_{sm}$ with a box filter and find the maximum value of the result. If this peak value is above a threshold $\theta_{newOcc}$, we regard its location as that of a candidate new person. The box filter size is again a physically-motivated parameter, with width and height equal to an estimate of twice the average torso width $W_{avg}$ of people. We use a value of $W_{avg}$ around 75 cm. For most people, this size encompasses the plan-view representation not just of the torso, but also includes most or all of person's limbs.

We apply additional tests $\mathcal{H}_{masked}$ and $\mathcal{O}_{sm}$ at the candidate person location to better verify that this is a person and not some other type of object. Currently, we require that two simple tests be passed:

1. The highest value in $\mathcal{H}_{masked}$ within a square of width $W_{avg}$ centered at the candidate person location must exceed some plausible minimum height $\theta_{newHt}$ for people.
2. Among the camera-view foreground pixels that map to the plan-view square of width $W_{avg}$ centered at the candidate person location, the fraction of those whose luminance has changed significantly since the last frame must exceed a threshold $\theta_{newAct}$.

These tests ensure that the foreground object is physically large enough to be a person, and is more physically active than, for instance, a statue. However, these tests may sometimes exclude small children or people in unusual postures, and sometimes may fail to exclude large, non-static, non-person objects such as foliage in wind. Some of these errors may be avoided by restricting the detection of people to certain entry zones in the plan-view map.

Whether or not the above tests are passed, we delete, after the tests have been applied, the height and occupancy map data within a square of width $W_{avg}$ centered at the location of the box filter convolution maximum. We then apply the ox filter to $\mathcal{O}_{sm}$ again to look for another candidate new person location. This process continues until the convolution peak value falls below $\theta_{newOcc}$, indicating that there are no more likely locations at which to check for newly occurring people.

In detecting a new person to be tracked, our philosophy is that we would like to see him without substantial occlusion for a few frames before we officially add him to our "tracked person" list. We therefore aim to set the new person occupancy threshold $\theta_{newOcc}$ so that half of an average-sized person must be visible to the stereo pair in order to exceed it. This is approximately implemented using $\theta_{newOcc} = \frac{1}{2} \times \frac{1}{2} \times W_{avg} \mathcal{H}_{avg}$, where $W_{avg}$ and $\mathcal{H}_{avg}$ denote average person width and height, and where the extra factor of $\frac{1}{2}$ compensates for the non-rectangularity of people and the possibility of unreliable depth data. We also do not allow the detection of a candidate new person within some small plan-view distance (e.g., $2 \times W_{avg}$) of any currently tracked people, so that our box filter detection mechanism is less susceptible to exceeding $\theta_{newOcc}$ due to contribution of occupancy from the plan-view fringes of more than one person. Finally, after a new person is detected, he remains only a "candidate" until he is tracked successfully for some minimum number of consecutive frames. No track is reported while the person is still a candidate, although the track measured during this probational period may be retrieved later.

3.2 Tracking with Plan-View Templates

In the illustrated embodiments, classical Kalman filtering is used to track patterns of plan-view height and occupancy statistics over time. The Kalman state maintained for each tracked person is the three-tuple $\langle \vec{x}, \vec{v}, \vec{S} \rangle$, where $\vec{x}$ is the two-dimensional plan-view location of the person, $\vec{v}$ is the two-dimensional plan-view velocity of the person, and $\vec{S}$ represents the body configuration of the person. In some embodiments, body configuration may be parameterized in terms of joint angles or other pose descriptions. In the illustrated embodiments, however, we find that simple templates of plan-view height and occupancy statistics provide an easily computed but powerful shape description. In these embodiments, we update the $\vec{S}$ component of the Kalman state directly with values from subregions of the $\mathcal{H}_{masked}$ and $\mathcal{O}_{sm}$ images, rather than first attempt to infer body pose from these statistics, which is likely an expensive and highly error-prone process. The Kalman state may therefore more accurately be written as $\langle \vec{x}, \vec{v}, T_H, T_O \rangle$, where $T_H$ and $T_O$ are a person's height and occupancy templates, respectively. The observables in this Kalman framework are the same as the state; that is, we assume no hidden state variables.

For Kalman prediction in the illustrated embodiments, we use a constant velocity model, and we assume that person pose varies smoothly over time. At high system frame rates, we therefore would expect little change in a person's template-based representation from one frame to the next. For simplicity, we predict no change at all. Because the template statistics for a person are highly dependent on the visibility of that person to the camera, we are effectively also predicting no change in the person's state of occlusion between frames. These predictions will obviously not be correct in general, but they will become increasingly accurate as the system frame rate is increased. Fortunately, the simple computations employed by this method are well-suited for high-speed implementation, so that it is not difficult to construct a system that operates at a rate where our predictions are reasonably approximate.

The measurement step of the Kalman process is carried out for each person individually, in order of our confidence in their current positional estimates. This confidence is taken to be proportional to the inverse of $\sigma_{\vec{x}}^2$, the variance for the Kalman positional estimate $\vec{x}$. To obtain a new position measurement for a person, we search in the neighborhood of the predicted person position $\vec{x}_{pred}$ for the location at which the current plan-view image statistics best match the predicted ones for the person. The area in which to search is centered at $\vec{x}_{pred}$, with a rectangular extent determined from $\sigma_{\vec{x}}^2$. A match score M is computed at all locations within the search zone, with lower values of M indicating better matches. The person's match score M at plan-view location $\vec{x}$ is computed as:

$$M(\vec{x}) = \alpha * \text{SAD}(T_H, H_{masked}(\vec{x})) + \beta * \text{SAD}(T_O, O_{sm}(\vec{x})) + \gamma * \text{DISTANCE}(\vec{x}_{pred}, \vec{x}) \quad (4)$$

SAD refers to "sum of absolute differences," but averaged over the number of pixels used in the differencing operation so that all matching process parameters are independent of the template size. For the height SAD, we use a height difference of $H_{max}/3$ at all pixels where $T_H$ has been masked to zero but $\mathcal{H}_{sm}$ masked has not, or vice versa. This choice of matching score makes it roughly linearly proportional to three metrics that are easily understood from a physical standpoint:

1. The difference between the shape of the person when seen from overhead, as indicated by $T_H$, and that of the current scene foreground, as indicated by the masked height map, in the neighborhood of (x, y).
2. The difference between the tracked person's visible surface area, as indicated by $T_O$, and that of the current scene foreground, as indicated by the smoothed occupancy map, in the neighborhood of (x, y).
3. The distance between (x, y) and the predicted person location.

In some embodiments, we set the weightings α and β so that the first two types of differences are scaled similarly. An appropriate ratio for the two values can be determined from the same physically motivated constants we have used to compute other parameters. We set γ based on the search window size, so that distance will have a lesser influence than the template comparison factors. We have found in practice that γ can be decreased to zero without significantly disrupting tracking, but that non-zero values of γ help to smooth person tracks.

In some embodiments, when comparing a height template $T_H$ to $\mathcal{H}_{masked}$ via the SAD operation, differences at pixels where one height value has been masked out but the other has not are not included, as this might artificially inflate the SAD score. On the other hand, if $\mathcal{H}_{masked}$ is zero at many locations where the corresponding pixels of $T_H$ are not, or vice versa, we would like the SAD to reflect this inconsistency somehow. Therefore, in some embodiments, we modify the SAD process, for the height comparison only, to substitute a random height difference whenever either, but not both, of the corresponding pixels of $\mathcal{H}_{masked}$ and $T_H$ are zero. The random height difference is selected according to the probability distribution of all possible differences, under the assumption that height values are distributed uniformly between 0 and $H_{max}$.

In these embodiments, if the best (minimal) match score found falls below a threshold $\theta_{track}$, we update the Kalman state with new measurements. The location $\vec{x}_{best}$ at which $M(\vec{x})$ was minimized serves as the new position measurement, and the new velocity measurement is the inter-frame change in position divided by the time difference. The statistics of $\mathcal{H}_{masked}$ and $\mathcal{O}_{sm}$ surrounding $\vec{x}_{best}$ are used as the new body configuration measurement for updating the templates. This image data is cleared before tracking of another person is attempted. A relatively high Kalman gain is used in the update process, so that templates adapt quickly.

If the best match score is above $\theta_{track}$, we do not update the Kalman state with new measurements, and we report $\vec{x}_{pred}$ as the person's location. The positional state variances are incremented, reflecting our decrease in tracking confidence for the person. The person is also placed on a temporary list of "lost" people.

After template-based tracking and new person detection have been completed, we determine, for each lost person, whether or not any newly detected person is sufficiently close in space (e.g. 2 meters) to the predicted location of the lost person or to the last place he was sighted. If so, and if the lost person has not been lost too long, we decide that the two people are a match, and we set the lost person's Kalman state to be equal to that of the newly detected person. If a lost person cannot be matched with any newly detected person, we consider how long it has been since the person was successfully tracked. If it has been too long (above some time threshold such as 4 seconds), we decide that the person is permanently lost, and we delete him from the list of people we are trying to track.

3.3 Avoidance of Adaptive Template Problems

Most template-based tracking methods that operate on camera-view images encounter difficulty in selecting and adapting the appropriate template size for a tracked object, because the size of the object in the image varies with its distance from the camera. In the plan-view framework described above, however, we are able to obtain good performance with a template size that remains constant across all people and all time. Specifically, we employ square templates whose sides have a length in pixels that, when multiplied by the plan-view map resolution $\delta_{ground}$, is roughly equal to $W_{avg}$, our estimate of the twice the average torso width of people.

This is reasonable because of a combination of two factors. The first of these is that our plan-view representations of people are, ideally, invariant to the floor locations of the people relative to the camera. In practice, the plan-view statistics for a given person become more noisy as he moves away from the camera, because of the smaller number of camera-view pixels that contribute to them. Nevertheless, some basic properties of these statistics, such as their typical magnitudes and spatial extents, do not depend on the person's distance from the camera, so that no change in template size is necessitated by the person's movement around the room.

The other factor allowing us to use a fixed template size is that people spend almost all of their waking time in a predominantly upright position (even when sitting), and the spatial extents of most upright people, when viewed from overhead, are confined to a relatively limited range. If we posit that the average width of an adult human torso, from shoulder to shoulder, is somewhere between 35–45 cm, then our template width $W_{avg}$ of 75 cm can be assumed to be large enough to accommodate the torsos of nearly all upright people, as well as much of their outstretched limbs, without being overly large for use with small or closely-spaced people. For people of unusual size or in unusual postures, this template size still works well, although perhaps it is not ideal. As we develop more sophisticated methods of analyzing person shape and activity, we may allow our templates to adapt in size when appropriate.

Templates that are updated over time with current image values inevitably "slip off" the tracked target, and begin to reflect elements of the background. This is perhaps the primary reason that adaptive templates are seldom used in current tracking methods, and our method as described thus far suffers from this problem as well. However, with our plan-view statistical basis, it is relatively straightforward to counteract this problem in ways that are not feasible for other image substrates. Specifically, we are able to virtually eliminate template slippage through a simple "re-centering" scheme, detailed below, that is applied on each frame after tracking has completed.

For each tracked person, we first examine the quality of the current height template $T_H$. If the fraction of non-zero pixels in $T_H$ has fallen below a threshold $\theta_{HTcount}$ (around 0.3), or if the centroid of these non-zero pixels is more than a distance $\theta_{HTcentroid}$ (around $0.25 \times W_{avg}$) from the template center, we decide that the template has slipped too far off the person. We then search, within a square of width $W_{avg}$ centered at the person's current plan-view position estimate, for the location $\vec{x}_{occmax}$ in $\mathcal{O}_{sm}$ of the local occupancy maximum. New templates $T_H$ and $T_\phi$ then are extracted from $\mathcal{H}_{masked}$ and $\mathcal{O}_{sm}$ at $\vec{x}_{occmax}$. Also, the person location in the Kalman state vector is shifted to $\vec{x}_{occmax}$, without changing the velocity estimates or other Kalman filter parameters.

We have found this re-centering technique to be very effective in keeping templates solidly situated over the plan-view statistics representing a person, despite depth noise, partial occlusions, and other factors. This robustness arises from our ability to use the average person size $W_{avg}$ to constrain both our criteria for detecting slippage and our search window for finding a corrected template location.

4 Other Embodiments 4.1 Plan-View Images of Associated, Non-Positional Features

In Section 3.1 above, plan-view images are made with values that are derived directly from statistics of the locations of the points in the 3D point clouds. The positional information of these points is derived entirely from a depth image. In the case where the depth video stream is associated with additional spatially- and temporally-registered video streams (e.g., color or grayscale video), each of the points in the 3D point cloud may be labeled with non-positional data derived from the corresponding pixels in the non-depth video streams. This labeling may be carried out in step 18 of the object tracking method of FIG. 1. In general, plan-view images may be vector-valued (i.e., they may contain more than one value at each pixel). For instance, a color plan-view image, perhaps one showing the color of the highest point in each bin, is a vector-valued image having three values (called the red level, green level, and blue level, typically) at each pixel. In step 26 of the object tracking method of FIG. 1, the associated, non-positional labels may be used to compute the plan-view pixel values representing the points that fall in the corresponding vertical bins.

For example, in some embodiments, when using depth and color video streams together, plan-view images showing the color associated with highest point (the one with maximum Z-value) in each vertical bin may be constructed. This effectively renders images of the color of the scene as if viewed (with orthographic camera projection) from above. If we prefer to render grayscale overhead views of the scene, we could convert the color values to grayscale, or we could begin with a grayscale input video stream instead of color. In other embodiments, plan-view images may be created that show, among other things, the average color or gray value associated with the 3D points within each bin, the brightest or most saturated color among points in each bin, or the color associated with the point nearest the average height among points in the bin. In other embodiments, the original input to the system may be one video stream of depth and one or more video streams of features other than color or gray values, such as infrared sensor readings, vectors showing estimates of scene motion at each pixel, or vectors representing the local visual texture in the scene. We may construct plan-view images whose values are derived from statistics of these features among the 3D points falling in each vertical bin.

In these embodiments, a person detection and tracking system may be built using the same method as described above, but with substitution for plan-view templates of height data with plan-view templates based on data from these other types of plan-view images. For instance, in some embodiments, plan-view templates of the color associated with the highest points in each of the bins may be used, rather than templates of the heights of these points.

4.2 Plan-View Slices

Figure 8:
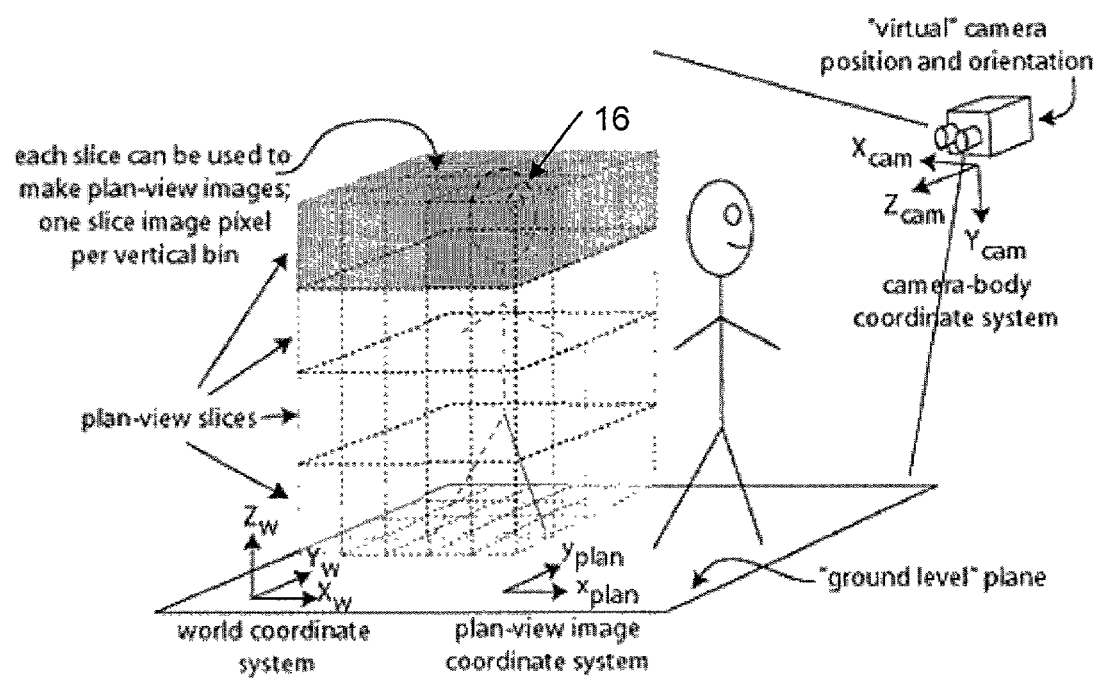
FIG. 8 is a diagrammatic perspective view of the three-dimensional coordinate system of FIG. 3 with the three-dimensional point cloud discretized along the vertical axis into multiple horizontal partitions.

All of the plan-view images discussed thus far have been constructed from a discretization of 3D space in only two dimensions, into vertical bins oriented along the Z-axis. These bins had either infinite or limited extent, but even in the case of limited extent it has been assumed that the bins covered the entire volume of interest. In some embodiments, space is further discretized along the third, Z-dimension, as shown in FIG. 8. In these embodiments, within the volume of interest in 3D space, each vertical bin is divided into several box-shaped sub-bins, by introducing dividing planes that are parallel to the ground-level plane. We can then apply any of the techniques for building plan-view images described above, including those for building occupancy maps, height maps, or maps of associated non-positional features, to only a "slice" of these boxes (i.e., a set of boxes whose centers lie in some plane parallel to the ground-level plane). One such slice of boxes is highlighted in FIG. 8.

In these embodiments, the Z-dimension may be divided into any number of such slices, and one or more plan-view images can be constructed using the 3D point cloud data within each slice. For instance, in a person-tracking application, we might the divide space between Z=0 and $Z=H_{max}$ (where $H_{max}$ is a variable representing, e.g., the expected maximum height of people to be tracked) into three slices parallel to the ground-level plane. One of these slices might extend from Z=0 to $Z=H_{max}/3$ and would be expected to contain most of the lower parts of people's bodies, a second slice might extend from $Z=H_{max}/3$ to $Z=2H_{max}/3$ and would usually include the middle body parts, and a third slice might run from $Z=2H_{max}/3$ to $Z=H_{max}$ and would typically include the upper body parts. In general, the slices do not need to be adjacent in space, and may overlap if desired. Using the 3D point cloud members within a given slice, we could compute a plan-view occupancy map, a plan-view height map, a map of the average color within each box in the slice, or other plan-view maps, as described in preceding sections.

After obtaining one or more plan-view maps per slice, we can apply tracking techniques, such as the one described above or close derivatives, to the maps obtained for each slice. For the example given above, we might apply three trackers in parallel: one for the plan-view maps generated for the lowest slice, one for the middle slice's plan-view maps, and one for the highest slice's plan-view maps. To combine the results of these independent trackers into a single set of coherent detection and tracking results, we would look for relationships between detection and tracking results in different layers that have similar (X,Y) coordinates (i.e. that are relatively well-aligned along the Z-axis). For the example given above, this might mean, for instance, that we would assume that an object tracked in the highest layer and an object tracked in the lowest layer are parts of the same person if the (X,Y) coordinates of the centers of these two objects are sufficiently close to each other. We also find it useful to not allow the trackers in different slices to run completely independently, but rather to allow the tracker results for a given slice to partially guide the other slices' trackers' search for objects. The tracking of several sub-parts associated with a single object also allows for greater robustness, since failure in tracking any one sub-part, perhaps due to its occlusion by other objects in the scene, may be compensated for by successful tracking of the other parts.

Still other embodiments are within the scope of the claims.

5 Conclusion

The above-described embodiments combine and refine plan-view statistical maps to produce an excellent substrate for person detection and tracking. In addition, these embodiments incorporate a template-based scheme for tracking in plan-view that takes great advantage of the detail in these plan-view maps, while avoiding the typical difficulties often associated with adaptive template tracking. The embodiments are highly amenable to real-time implementation and exhibit robust performance under challenging conditions.

The above-described object detection and tracking embodiments rely purely on passive observation of a scene with cameras: it does not require special behavior on the part of the objects to be tracked, does not require them to be labeled with special marks or electronic devices, and it does not rely on the existence of unusual scene conditions (such as special illumination or "magic dust" on the floor). These embodiments are robust in separating tracked objects from the scene background, in gauging the true physical size of the tracked objects (and therefore are able to tell what is "significant" and what is not, whether an object seen in one frame might be the same as that seen in another frame, etc.), are able to maintain correct tracks when a tracked object is partially or fully occluded in the camera's view by some other object in the scene, and are able to distinguish whether an object in the scene is of the type that an application wants to track.

The systems and methods described herein are not limited to any particular hardware or software configuration, but rather they may be implemented in any computing or processing environment, including in digital electronic circuitry or in computer hardware, firmware or software. These systems and methods may be implemented, in part, in a computer program product tangibly embodied in a machine-readable storage device for execution by a computer processor. In some embodiments, these systems and methods preferably are implemented in a high level procedural or object oriented programming language; however, the algorithms may be implemented in assembly or machine language, if desired. In any case, the programming language may be a compiled or interpreted language. The object tracking methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

What is claimed is:

1. A method of tracking an object observable in a time series of video frames representative of a visual scene, comprising:

generating a three-dimensional point cloud having members with one or more associated attributes obtained from the time series of video frames and representing selected image pixels in a three-dimensional coordinate system spanned by a ground plane and a vertical axis orthogonal to the ground plane;

partitioning the three-dimensional point cloud into a set of vertically-oriented bins;

mapping the partitioned three-dimensional point cloud into one or more plan-view images each containing for each vertically-oriented bin a corresponding pixel having one or more values computed based upon one or more attributes of the three-dimensional point cloud members occupying the corresponding vertically-oriented bin; and tracking the object based at least in part upon one or more of the plan-view images.

2. The method of claim 1, wherein pixel values in the one or more plan-view images correspond to a height statistic computed from vertical axis coordinate attributes of three-dimensional point cloud members occupying corresponding vertically-oriented bins.

3. The method of claim 2, wherein the vertical axis coordinate attributes of the three-dimensional point cloud members correspond to heights of the three-dimensional point cloud members relative to the ground plane.

4. The method of claim 3, wherein the height statistic corresponds to a measure summarizing a distributional aspect of the heights of the three-dimensional point cloud members in a vertically-oriented bin.

5. The method of claim 4, wherein the height statistic corresponds to one of a maximum height, a minimum height, a median height, a prescribed percentile height, or a height exceeding heights of a prescribed percentage of other three-dimensional point cloud members in a corresponding vertically-oriented bin.

6. The method of claim 1, further comprising mapping the partitioned three-dimensional point cloud into an occupancy map containing for each vertically-oriented bin a pixel having a value corresponding to a weighted count of the three-dimensional point cloud members occupying the corresponding vertically-oriented bin.

7. The method of claim 6, further comprising smoothing at least one of the one or more plan-view images and the occupancy map.

8. The method of claim 6, further comprising masking at least one of the one or more plan-view images based upon the occupancy map.

9. The method of claim 8, wherein masking comprises removing plan-view image pixels when values of corresponding occupancy map pixels are below a prescribed threshold.

10. The method of claim 9, wherein removing plan-view image pixels comprises setting values of plan-view image pixels to zero.

11. The method of claim 9, further comprising computing the prescribed threshold based upon a measure of three-dimensional point cloud partition resolution and a prescribed maximum height value.

12. The method of claim 6, wherein tracking the object comprises detecting a location in the visual scene likely to contain the object.

13. The method of claim 12, wherein detecting the likely location comprises convolving a box filter with the occupancy map.

14. The method of claim 13, wherein the box filter has a size proportional to an estimate of a physical size of the object.

15. The method of claim 12, wherein detecting comprises performing one or more object classification tests based at least in part on image data from one or more plan view images near locations likely to contain the object.

16. The method of claim 6, wherein tracking the object comprises computing an object template based at least in part upon one or more of the selected plan-view images.

17. The method of claim 16, wherein computing the object template comprises masking one or more of the selected plan-view images based upon the occupancy map and copying a sub-region of the masked plan-view image centered at a location in the visual scene likely to contain the object.

18. The method of claim 16, wherein tracking the object further comprises computing an occupancy map template based at least in part upon the occupancy map.

19. The method of claim 18, wherein computing the object shape template comprises copying a sub-region of the occupancy map centered at a location in the visual scene likely to contain the object.

20. The method of claim 18, further comprising tracking the position and velocity of the object in the one or more selected plan-view images.

21. The method of claim 1, wherein generating the three-dimensional point cloud comprises labeling point cloud members with one or more non-positional attribute values obtained from one or more video streams registered with the time series of video frames of depth image pixels, and pixel values of one or more selected plan-view images are computed based upon one or more non-positional attribute values of the three-dimensional point cloud members occupying corresponding vertically-oriented bins.

22. The method of claim 21, wherein three-dimensional point cloud members are labeled with color attribute values.

23. The method of claim 22, wherein pixel values in the one or more selected plan-view images correspond to a color statistic computed from color attributes of three-dimensional point cloud members occupying corresponding vertically-oriented bins.

24. The method of claim 23, wherein the color statistic corresponds to one of average color, brightest color, or most saturated color.

25. The method of claim 21, wherein pixel values in the one or more selected plan-view images correspond to non-positional attribute values selected based upon a height statistic computed from vertical axis coordinate attributes of three-dimensional point cloud members occupying corresponding vertically-oriented bins.

26. The method of claim 25, wherein pixel values in the one or more selected plan-view images correspond to color values of three-dimensional point cloud members selected based upon the height statistic.

27. The method of claim 21, wherein non-positional attribute values correspond to one or more of infrared sensor reading values, vectors showing estimates of scene motion, and vectors representing local visual texture in the visual scene.

28. The method of claim 1, further comprising segmenting foreground pixels from background pixels before generating the three-dimensional point cloud based at least in part upon one or more of the registered video streams.

29. The method of claim 28, wherein segmenting foreground pixels comprises:
maintaining one or more pixel-level historical models of spatially local pixel observations;
segmenting pixels into two or more labeled groups based at least in part upon comparison of pixel-level video input with the one or more pixel-level historical models; and
updating the one or more pixel-level historical models based at least in part upon one or more feedback maps identifying pixels respectively segmented into the one or more labeled groups in conformity with a spatially non-local segmentation model.

30. The method of claim 1, wherein each plan-view image pixel is associated with multiple values computed based upon multiple attributes of the three-dimensional point cloud members occupying the corresponding vertically-oriented bin.

31. The method of claim 1, wherein partitioning the three-dimensional point cloud further comprises discretizing the three-dimensional point cloud along the vertical axis into two or more horizontal partitions.

32. The method of claim 31, wherein mapping the partitioned three-dimensional point cloud comprises constructing at least one selected plan-view image containing for each vertically-oriented bin a corresponding pixel having one or more values computed based upon one or more attributes of the three-dimensional point cloud members occupying a selected horizontal partition of the corresponding vertically-oriented bin.

33. The method of claim 32, wherein pixel values in the selected plan-view image correspond to a height statistic computed from vertical axis coordinate attributes of three-dimensional point cloud members occupying the selected horizontal partition of the corresponding vertically-oriented bins.

34. The method of claim 32, wherein pixel values in the selected plan-view image correspond to a statistic computed from non-positional attribute values of three-dimensional point cloud members occupying the selected horizontal partition of the corresponding vertically-oriented bins.

35. The method of claim 32, wherein the selected horizontal partition of the corresponding vertically-oriented bins is separated from the ground plane.

36. The method of claim 31, further comprising mapping the partitioned three-dimensional point cloud into an occupancy map containing for each vertically-oriented bin a pixel having a value corresponding to a count of the three-dimensional point cloud members occupying a horizontal partition of the corresponding vertically-oriented bin.

37. The method of claim 31, wherein the three-dimensional point cloud is discretized into horizontal partitions selected based upon a height estimate of the object to be tracked.

38. The method of claim 31, further comprising tracking the object in plan-view images corresponding to multiple horizontal partitions.

39. The method of claim 38, wherein tracking the object comprises combining results of tracking the object in plan-view images corresponding to multiple horizontal partitions.

40. The method of claim 39, wherein combining tracking results comprises detecting plan-view alignment in the results of tracking the object in plan-view images corresponding to multiple horizontal partitions.

41. A system for tracking an object observable in a time series of video frames representative of a visual scene, comprising one or more processing modules operable to:
generate a three-dimensional point cloud having members with one or more associated attributes obtained from the time series of video frames and representing selected image pixels in a three-dimensional coordinate system spanned by a ground plane and a vertical axis orthogonal to the ground plane;
partition the three-dimensional point cloud into a set of vertically-oriented bins;
map the partitioned three-dimensional point cloud into one or more plan-view images each containing for each vertically-oriented bin a corresponding pixel having one or more values computed based upon one or more attributes of the three-dimensional point cloud members occupying the corresponding vertically-oriented bin; and
track the object based at least in part upon one or more of the plan-view images.

42. A method of tracking an object observable in a time series of video frames representative of a visual scene, comprising:
generating a three-dimensional point cloud having members with one or more associated attributes obtained from the time series of video frames and representing selected pixels in a three-dimensional coordinate system spanned by a ground plane and a vertical axis orthogonal to the ground plane;
partitioning the three-dimensional point cloud into a set of vertically-oriented bins;
mapping the partitioned three-dimensional point cloud into one or more plan-view images each containing for each vertically-oriented bin a corresponding pixel having one or more values computed based upon the three-dimensional point cloud members occupying the corresponding vertically-oriented bin;
extracting one or more object templates from at least one of the one or more plan-view images; and
tracking the object based at least in part upon a comparison of at least one of the object templates with regions of the corresponding plan-view images.

43. The method of claim 42, further comprising extracting a re-centered object template based upon a determination that an object template has slipped off the tracked object.

44. The method of claim 43, wherein a re-centered object template is extracted based upon an analysis of pixels within the corresponding object template.

45. The method of claim 44, wherein a re-centered object template is extracted based upon a spatial distribution analysis of pixels within the corresponding object template.

46. The method of claim 45, wherein the spatial distribution analysis comprises analyzing a count of non-zero pixels within the corresponding object template.

47. The method of claim 42, wherein pixel values of one or more selected plan-view images are computed based upon one or more attributes of the three-dimensional point cloud members.

48. The method of claim 47, wherein pixel values of at least one of the one or more selected plan-view images correspond to a height statistic computed from vertical axis coordinate attributes of three-dimensional point cloud members occupying corresponding vertically-oriented bins.

49. The method of claim 47, wherein pixel values of at least one of the one or more selected plan-view images correspond to a statistic computed from non-positional attribute values of three-dimensional point cloud members occupying corresponding vertically-oriented bins.

50. The method of claim 42, wherein of at least one of the one or more selected plan-view images corresponds to an occupancy map containing for each vertically-oriented bin a pixel having a value corresponding to a weighted count of the three-dimensional point cloud members occupying the corresponding vertically-oriented bin.

51. The method of claim 42, wherein partitioning the three-dimensional point cloud further comprises discretizing the three-dimensional point cloud along the vertical axis into two or more horizontal partitions.

52. The method of claim 51, wherein mapping the partitioned three-dimensional point cloud comprises constructing at least one selected plan-view image containing for each vertically-oriented bin a corresponding pixel having one or more values computed based upon one or more attributes of the three-dimensional point cloud members occupying a selected horizontal partition of the corresponding vertically-oriented bin.

53. The method of claim 51, further comprising tracking the object in plan-view images corresponding to multiple horizontal partitions.

54. The method of claim 53, wherein tracking the object comprises combining results of tracking the object in plan-view images corresponding to multiple horizontal partitions.

55. The method of claim 54, wherein combining tracking results comprises detecting plan-view alignment in the results of tracking the object in plan-view images corresponding to multiple horizontal partitions.

56. The method of claim 42, further comprising mapping the partitioned three-dimensional point cloud into an occupancy map containing for each vertically-oriented bin a pixel having a value corresponding to a weighted count of the three-dimensional point cloud members occupying the corresponding vertically-oriented bin.

57. The method of claim 56, wherein computing an object template comprises masking one or more of the selected plan-view images based upon the occupancy map and copying a sub-region of the masked plan-view image centered at a location in the visual scene likely to contain the object.

58. The method of claim 56, wherein tracking the object further comprises computing an occupancy map template based at least in part upon the occupancy map.

59. The method of claim 58, wherein computing an object template comprises copying a sub-region of the occupancy map centered at a location in the visual scene likely to contain the object.

60. The method of claim 58, further comprising tracking the position and velocity of the object in the one or more selected plan-view images.

61. A system for tracking an object observable in a time series of video frames representative of a visual scene, comprising one or more processing modules operable to:
  generate a three-dimensional point cloud having members with one or more associated attributes obtained from the time series of video frames and representing selected pixels in a three-dimensional coordinate system spanned by a ground plane and a vertical axis orthogonal to the ground plane;
  partition the three-dimensional point cloud into a set of vertically-oriented bins;
  map the partitioned three-dimensional point cloud into one or more plan-view images each containing for each vertically-oriented bin a corresponding pixel having one or more values computed based upon the three-dimensional point cloud members occupying the corresponding vertically-oriented bin;
  extract one or more original object templates from at least one of the one or more plan-view images;
  track the object based at least in part upon a comparison of at least one of object templates with regions of the corresponding plan-view images.

62. A method of tracking an object observable in a time series of video frames representative of a visual scene, comprising:
  generating a three-dimensional point cloud having members with one or more associated attributes obtained from the time series of video frames and representing selected image pixels in a three-dimensional coordinate system spanned by a ground plane and a vertical axis orthogonal to the ground plane;
  partitioning the three-dimensional point cloud into a set of vertically-oriented bins;
  discretizing the three-dimensional point cloud along the vertical axis into two or more horizontal partitions;
  mapping the partitioned three-dimensional point cloud into two or more plan-view images each containing for each vertically-oriented bin a corresponding pixel having one or more values computed based upon the three-dimensional point cloud members occupying a respective horizontal partition of the corresponding vertically-oriented bin; and
  tracking the object based at least in part upon one or more of the plan-view images.

63. The method of claim 62, wherein pixel values of one or more selected plan-view images are computed based upon one or more attributes of the three-dimensional point cloud members.

64. The method of claim 63, wherein pixel values of the one or more selected plan-view images correspond to a height statistic computed from vertical axis coordinate attributes of three-dimensional point cloud members occupying corresponding vertically-oriented bins.

65. The method of claim 62, wherein pixel values of the one or more selected plan-view images correspond to a statistic computed from non-positional attribute values of three-dimensional point cloud members occupying corresponding vertically-oriented bins.

66. The method of claim 62, wherein at least one of the plan-view images corresponds to an occupancy map containing for each vertically-oriented bin a pixel having a value corresponding to a weighted count of the three-dimensional point cloud members occupying the corresponding vertically-oriented bin.

67. The method of claim 66, further comprising masking at least one of the plan-view images based upon the occupancy map.

68. The method of claim 62, further comprising tracking the object in plan-view images corresponding to multiple horizontal partitions.

* * * * *